US009220035B2

United States Patent
Miura et al.

(10) Patent No.: US 9,220,035 B2
(45) Date of Patent: Dec. 22, 2015

(54) RADIO CONTROL BASE STATION AND METHOD OF DETERMINING CONNECTION-TARGET SWITCHING CENTER

(75) Inventors: Hirotsugu Miura, Chiyoda-ku (JP); Kazunori Obata, Chiyoda-ku (JP); Seigo Harano, Chiyoda-ku (JP); Tadashi Uchiyama, Chiyoda-ku (JP); Kosuke Fujino, Chiyoda-ku (JP); Shogo Yabuki, Chiyoda-ku (JP); Ryouichi Shimizu, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 113 days.

(21) Appl. No.: 14/117,453

(22) PCT Filed: May 24, 2012

(86) PCT No.: PCT/JP2012/063388
§ 371 (c)(1),
(2), (4) Date: Nov. 13, 2013

(87) PCT Pub. No.: WO2012/165306
PCT Pub. Date: Dec. 6, 2012

(65) Prior Publication Data
US 2014/0301200 A1 Oct. 9, 2014

(30) Foreign Application Priority Data

Jun. 2, 2011 (JP) ................................. 2011-124503

(51) Int. Cl.
*H04W 28/08* (2009.01)
*H04W 76/02* (2009.01)
(Continued)

(52) U.S. Cl.
CPC ............ *H04W 28/085* (2013.01); *H04W 28/08* (2013.01); *H04W 76/02* (2013.01); *H04W 36/12* (2013.01); *H04W 48/18* (2013.01); *H04W 88/12* (2013.01)

(58) Field of Classification Search
None
See application file for complete search history.

(56) References Cited

U.S. PATENT DOCUMENTS

| 2010/0124933 | A1* | 5/2010 | Chowdhury | ........ H04L 12/5695 |
| | | | | 455/453 |
| 2012/0040684 | A1* | 2/2012 | Gao | ....................... H04W 28/08 |
| | | | | 455/453 |

FOREIGN PATENT DOCUMENTS

| EP | 1921811 A2 * | 5/2008 | ............ H04W 28/08 |
| JP | 5 219556 | 8/1993 | |

(Continued)

OTHER PUBLICATIONS

3GPP TS 23.401 v 10.3.0, Mar. 2011, Release 10, pp. 27-28.*
(Continued)

*Primary Examiner* — Marcus R Smith
*Assistant Examiner* — Lakeram Jangbahadur
(74) *Attorney, Agent, or Firm* — Oblon, McClelland, Maier & Neustadt, L.L.P.

(57) ABSTRACT

A radio control base station connected to a plurality of switching centers includes a capacity information receiving unit configured to receive capacity information from at least one of the plurality of switching centers, a load information receiving unit configured to receive load information from at least one of the plurality of switching centers, a selection ratio calculating unit configured to calculate a selection ratio for selecting a connection-target switching center to which a call from a mobile station is to be connected based on the received capacity information and the received load information, and a connection-target switching center determining unit configured to determine the connection-target switching center based on the calculated selection ratio.

5 Claims, 7 Drawing Sheets

(51) Int. Cl.
*H04W 88/12* (2009.01)
*H04W 36/12* (2009.01)
*H04W 48/18* (2009.01)

(56) References Cited

FOREIGN PATENT DOCUMENTS

| | | |
|---|---|---|
| JP | 8 340380 | 12/1996 |
| JP | 2008 124799 | 5/2008 |
| JP | 2010 171714 | 8/2010 |

OTHER PUBLICATIONS

3GPP TS 23.401 V10.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 10)", LTE Advanced, pp. 1-28, (Mar. 2011).
3GPPS TS 23.401 V8.2.0, "4.3.7.4 MME control of Overload", pp. 19-20, (Jun. 2008).
3GPPS TS 36.401 V8.8.0, "E-UTRAN architecture", p. 10, (Jun. 2010).
3GPPS TS 36.413 V8.10.0, "Functions of S1AP", pp. 18-19, 80-81, and 114, (Jun. 2010).
3GPPS TS 36.331 V8.12.0, "5.3.3.4 Reception of the RRCConnectionSetup by the UE", pp. 34-35, (Dec. 2010).
3GPP TSG SA WG2 Meeting #63, "Load balancing at MME selection", Ericsson, Total 2 Pages, (Feb. 2008).
Japanese Office Action Issued Mar. 26, 2013 in Japanese Patent Application No. 2011-124503 Filed Jun. 2, 2011 (with English translation).
Japanese Office Action Issued Jan. 8, 2013 in Japanese Patent Application No. 2011-124503 Filed Jun. 2, 2011 (with English translation).
International Search Report Issued Jun. 19, 2012 in PCT/JP12/063388 Filed May 24, 2012.
Extended European Search Report issued Jul. 1, 2015 in Patent Application No. 12793023.8.
"MME Load Balancing Enablers" 3GPP TSG-RAN3 Meeting #61, RAN WG3, XP050165233, R3-082189, 2008, 54 pages.
"Remaining Open Issues in Load Balancing" 3GPP TSG RAN3 Meeting #61, RAN WG3, XP050165232, R3-082188, 2008, 3 pages.

* cited by examiner

RADIO CONTROL BASE STATION AND METHOD OF DETERMINING CONNECTION-TARGET SWITCHING CENTER

TECHNICAL FIELD

The present invention relates to a radio control base station and a method of determining a connection-target switching center.

BACKGROUND ART

In the technical field of mobile communications, various mobile communication systems in current use or for future use are developed by 3GPP (The 3rd Generation Partnership Project). In particular, an E-UTRA (Evolved UMTS Terrestrial Radio Access) system or an E-UTRAN (Evolved UMTS Terrestrial Radio Access Network) system is under discussion as a successor to a UTRA (UMTS Terrestrial Radio Access) system or a UTRAN (UMTS Terrestrial Radio Access Network) system which is based on a W-CDMA (Wideband-Code Division Multiple Access) system. The E-UTRA system or the E-UTRAN system is also referred to as "LTE (Long Term Evolution)".

According to the 3GPP specification (see 3GPP TS36.401 V8.8.0 (2010 June)), an interface between a radio control base station (eNB: evolved Node B) and a switching center (MME: Mobile Management Entity) in the LTE system is arranged as a multi-connection configuration in which a plurality of eNBs and a plurality of MMEs are mutually connected, thereby achieving load distribution. Upon connection establishment, capacity information indicating the number of calls that the MME can accept is transmitted from the MME to the eNB (see 3GPP TS36.413 V8.10.0 (2010 June)). The eNB identifies a connection-target MME (an MME to which a call is to be connected) based on information included in a radio connection request (Message 3) or a radio connection complete report (Message 5) from a mobile station (UE: User Equipment). If the eNB cannot identify a connection-target MME, the eNB selects an MME based on capacity information which has been transmitted from the MMEs.

DISCLOSURE OF INVENTION

Problem(s) to be Solved by the Invention

There is a problem in transmitting only capacity information, as described below. Specifically, the eNB may select an MME with a high-load state as a connection-target MME, because the eNB selects the connection-target MME only based on capacity information of the MMEs, but does not consider actual loads of the MMEs.

It is a general object of the present invention to prevent a call from being connected to a switching center with a high-load state to achieve load distribution of the switching center.

Means for Solving the Problem(s)

In one aspect of the present invention, there is provided a radio control base station connected to a plurality of switching centers, comprising:

a capacity information receiving unit configured to receive capacity information from at least one of the plurality of switching centers;

a load information receiving unit configured to receive load information from at least one of the plurality of switching centers;

a selection ratio calculating unit configured to calculate a selection ratio for selecting a connection-target switching center to which a call from a mobile station is to be connected based on the received capacity information and the received load information; and a connection-target switching center determining unit configured to determine the connection-target switching center based on the calculated selection ratio.

In another aspect of the present invention, there is provided a method of determining a connection-target switching center in a radio control base station connected to a plurality of switching centers, comprising the steps of:

receiving capacity information from at least one of the plurality of switching centers;

receiving load information from at least one of the plurality of switching centers;

calculating a selection ratio for selecting the connection-target switching center to which a call from a mobile station is to be connected based on the received capacity information and the received load information; and determining the connection-target switching center based on the calculated selection ratio.

Advantageous Effect of the Invention

According to the present invention, load distribution of the switching center can be achieved.

DETAILED DESCRIPTION OF THE PREFERRED EMBODIMENTS

An embodiment of the present invention is described below in connection with configurations and operations for selecting a connection-target MME in a radio control base station (eNB) within a mobile communication system including a mobile station (UE), the radio control base station (eNB), and a switching center (MME). In the mobile communication system, the eNB is connected to a plurality of MMEs and selects a connection-target MME among the connected MMEs.

The eNB receives capacity information from each MME. The eNB also receives load information from each MME. The eNB calculates a selection ratio for selecting the connection-target MME to which a call from the mobile station is to be connected based on the received capacity information and the received load information. The selection ratio for selecting the connection-target MME is a ratio for selecting one MME to which a call from the mobile station should be connected among the plurality of MMEs which are connected to the eNBs and can be selected. When N number of MMEs are connected to the eNB and can be selected, the selection ratio may be expressed as a ratio for selecting a first MME: a ratio for selecting a second MME: . . . : a ratio for selecting a N-th MME. Then, the eNB determines the connection-target MME based on the calculated selection ratio. In this manner, the eNB can select an MME with a low-load state as the connection target MME.

With reference to the drawings, an embodiment of the present invention is described below.

Figure 1:
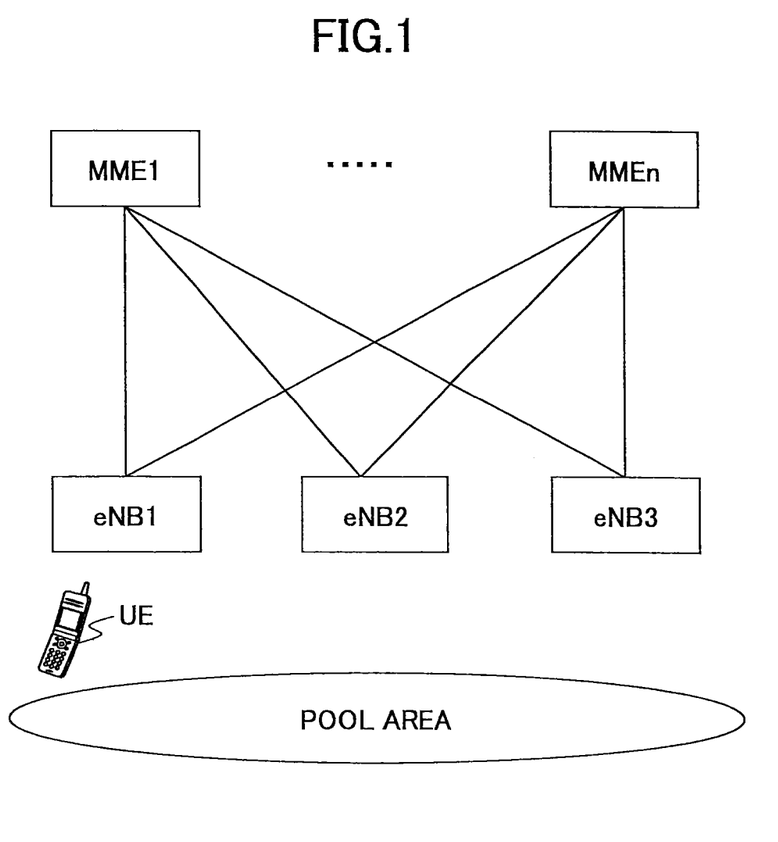
FIG. 1 shows an overall architecture of a mobile communication system in accordance with an embodiment of the present invention.

FIG. 1 shows an overall architecture of a mobile communication system in accordance with an embodiment of the present invention.

Typically, the mobile communication system is an LTE system. However, an embodiment of the present invention is not limited to an LTE system, but is applicable to any system in which capacity information and load information are transmitted from a switching center to a radio control base station. For example, an embodiment of the present invention is applicable to a fourth-generation mobile communication system or the like.

The mobile communication system includes a mobile station (UE), a radio control base station (eNB), and a switching center (MME). The UE may be any apparatus, such as a smart phone or the like, which is capable of communicating with the eNB. The eNB is an apparatus which receives a call (voice or data packet) from the UE and relays the call to a specified destination. The MME is an apparatus which sets a transmission path for the call from the UE. The interface between the MME and the eNB is called an "S1 interface".

In order to transmit a call from the UE to the destination, the UE needs to connect any one of MMEs via the eNB. A pool area is defined as an area where the UE can move around without changing MMEs. The pool area includes one or more MMEs. The pool area eliminates the need for frequently reselecting an MME by the UE every time the UE moves around. The pool area includes one or more tracking areas (TAs).

The eNB belongs to a plurality of MMEs within the pool area and is connected to these MMEs. The MME may be also connected to a plurality of eNBs. The connective relationship between eNBs and MMEs may be a many-to-many relationship. In order to process a call from the UE, the eNB needs to select an appropriate MME from the plural MMEs within the pool area and connect to it. In the embodiment of the present invention, the eNB selects a connection-target MME in consideration of capacity information and load information of MMEs.

Figure 2:
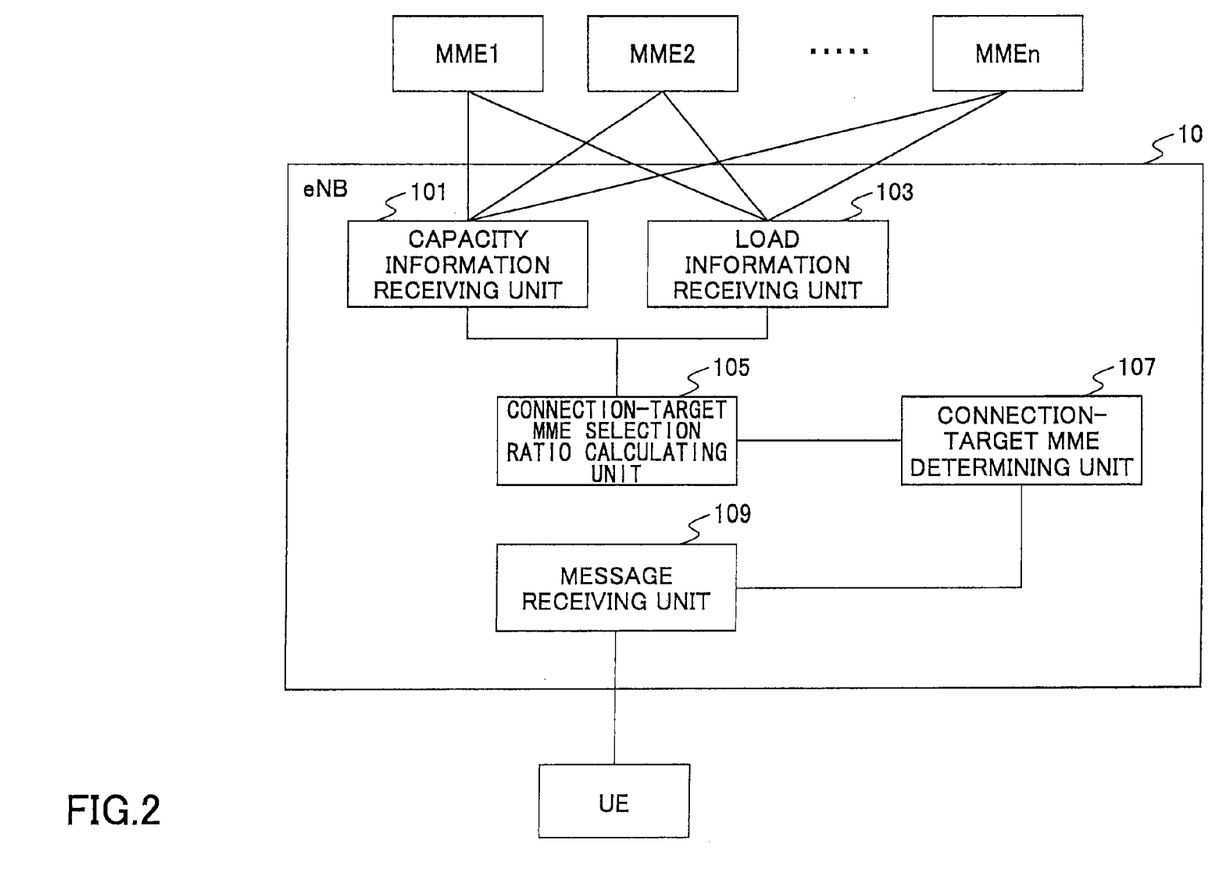
FIG. 2 shows a configuration of a radio control base station in accordance with an embodiment of the present invention.

FIG. 2 shows a configuration of an eNB in accordance with an embodiment of the present invention.

The eNB 10 includes a capacity information receiving unit 101, a load information receiving unit 103, a connection-target MME selection ratio calculating unit 105, a connection-target MME determining unit 107, and a message receiving unit 109.

The capacity information receiving unit 101 receives capacity information from at least one of the plurality of MMEs connected to the eNB 10. When capacities of all the connected MMEs need to be considered, the capacity information receiving unit 101 receives capacity information from all the connected MMEs. A capacity of an MME means the number of calls that the MME can accept. The capacity is defined in advance for each MME. For example, the capacity information is received when an initial link is established between the eNB 10 and each MME, when the configuration of an MME is modified, or the like.

The load information receiving unit 103 receives load information from at least one of the plurality of MMEs connected to the eNB 10. When loads of all the connected MMEs need to be considered, the load information receiving unit 103 receives load information from all the connected MMEs. A load of an MME means a load of a processing unit such as a CPU in the MME. The load changes dynamically with the passage of time. For example, the load information may be periodically received from an MME whose load is greater than or equal to a predetermined threshold. When the load information is not received, the load of the MME may be configured as a predetermined value (for example, zero).

The connection-target MME selection ratio calculating unit 105 calculates a selection ratio for selecting a connection target MME to which a call from the UE is to be connected based on the received capacity information and the received load information. The selection ratio may be calculated every time capacity information or load information is received or with predetermined periodicity.

The connection-target MME determining unit 107 determines the connection-target MME to which a call from the UE is to be connected based on the calculated selection ratio. When a radio link is established between the UE and the eNB 10 (for example, when the UE is powered on and a communication link is established between the UE and the eNB (when the UE transmits an attach request to the MME via the eNB in order to perform a tracking area update or the like for communication), when the UE originates a call, or when handover of the UE is performed), the connection-target MME determining unit 107 determines the connection-target MME to which a call from the UE is to be connected.

The message receiving unit 109 receives a call from the UE and a message associated with the call. For example, the message receiving unit 109 receives a preamble signal (Message 1) for initiating communication, a radio connection request (Message 3), a radio connection complete report (Message 5), and so on.

Figure 3:
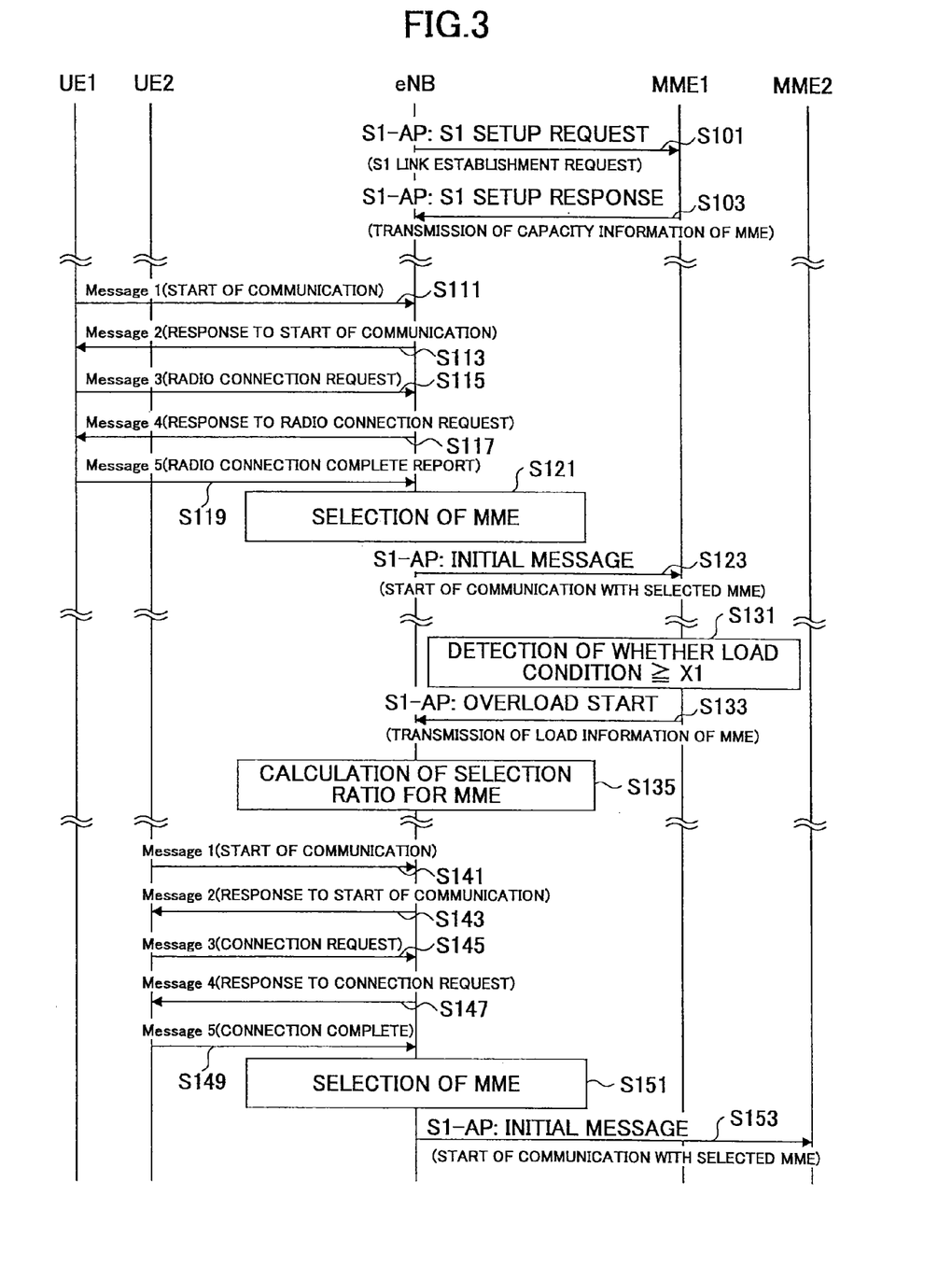
FIG. 3 shows a sequence diagram of a method of determining a connection-target MME in accordance with an embodiment of the present invention.

FIG. 3 shows a sequence diagram of a method of determining a connection-target MME in accordance with an embodiment of the present invention.

First, it is assumed that a link between an eNB and an MME1 is not established. When the eNB detects continuity after the cable connection between the eNB and the MME1, for example, the eNB transmits via the link a request (S1 Setup Request) for establishing an S1 link including a message such as an ID of the eNB (S101). The MME1 transmits capacity information of the MME1 to the eNB by responding to the request for establishing the S1 link (by transmitting an S1 Setup Response) (S103). While FIG. 3 shows a procedure for establishing the S1 link between the eNB and the MME1, an MME2 also transmits capacity information of the MME2 to the eNB. In this manner, the eNB obtains capacity information of MMEs within the pool area.

While FIG. 3 shows that the capacity information of the MME is transmitted to the eNB via the S1 Setup Response, the capacity information of the MME may be transmitted to the eNB via control information (Relative MME Capacity in MME Configuration Update) which is transmitted when the configuration of the MME is modified. For example, MME Configuration Update is used to transmit a reconfiguration value to the eNB when capacity information is changed due to a failure of the MME or the like.

Then, when a radio link is established between a UE1 and the eNB (for example, when the UE1 is powered on and a communication link is established between the UE1 and the eNB, when the UE1 originates a call, or when handover of the UE1 is performed), the UE1 transmits a preamble signal (Message 1) for initiating communication to the eNB (S111). The eNB transmits a response to the initiation of communication (Message 2) to the UE1 (S113). Then, the UE1 transmits a radio connection request (Message 3) to the eNB (S115), the eNB transmits a response to the radio connection request (Message 4) to the UE1 (S117), and the UE1 transmits a radio connection complete report (Message 5) to the eNB (S119).

Since the eNB has not received load information from the MME1 and MME2 yet, the eNB determines a connection-target MME for the UE1 based on the capacity of the MME1 and the capacity of the MME2 (S121). In step S121, when the Message 3 or the Message 5 includes information about an MME and the load of the MME is less than an upper limit of an allowable load, the MME identified by the Message 3 or the Message 5 may be determined as the connection-target MME. On the other hand, when an MME cannot be identified by the Message 3 or the Message 5, the eNB may determine the connection-target MME for the UE1 based on the capacity of the MME1 and the capacity of the MME2 connected to the eNB. In this example, it is assumed that the MME1 is determined as the connection-target MME. The eNB initiates communication by transmitting a message (Initial UE Message) for initiating communication to the MME1 (S123).

The MME1 monitors the load state of the MME1. For example, it is assumed that the load of the MME1 is greater than or equal to a predetermined threshold X1 due to the amount of traffic transmitted to and received from the UE1, for example, and the MME1 detects an overloaded state (S131). In this case, the MME1 transmits a message (Overload Start) indicating load information of the MME1 to the eNB (S133). The eNB may calculate a selection ratio as follows:

selection ratio for MME1=(capacity of MME1)*(maximum load of MME1−load of MME1).

When the load is expressed as a percentage, the selection ratio is calculated as follows:

selection ratio for MME1=(capacity of MME1)*(100−load of MME1).

Since load information has not been received from the MME2 yet, a selection ratio for the MME2 is equal to the capacity of MME2.

X1 is a threshold used when the MME enters an overloaded state and transmits a message (Overload Start) indicating load information. When the load of the MME is less than X1, the load information is not transmitted. When the MME1 is in an overloaded state, the load information may be periodically transmitted to the eNB. When the MME1 exits from the overloaded state, a message (Overload Start) indicating that the load of the MME1 is zero may be transmitted to the eNB. The load information of the MME may be transmitted to the eNB with Overload Reduction Percentage in Overload Start.

Then, when a radio link is established between a UE2 and the eNB (for example, when the UE2 is powered on and a communication link is established between the UE2 and the eNB, when the UE2 originates a call, or when handover of the UE2 is performed), the UE2 transmits a preamble signal (Message 1) for initiating communication to the eNB (S141). The eNB transmits a response to the initiation of communication (Message 2) to the UE2 (S143). Then, the UE2 transmits a radio connection request (Message 3) to the eNB (S145), the eNB transmits a response to the radio connection request (Message 4) to the UE2 (S147), and the UE1 transmits a radio connection complete report (Message 5) to the eNB (S149).

The eNB determines a connection-target MME for the UE2 based on the calculated selection ratio for the MME1 and the calculated selection ratio for the MME2 (S151). In this example, it is assumed that the MME2 is determined as the connection-target MME. The eNB initiates communication by transmitting a message (Initial UE Message) for initiating communication to the MME2 (S153).

Figure 4:
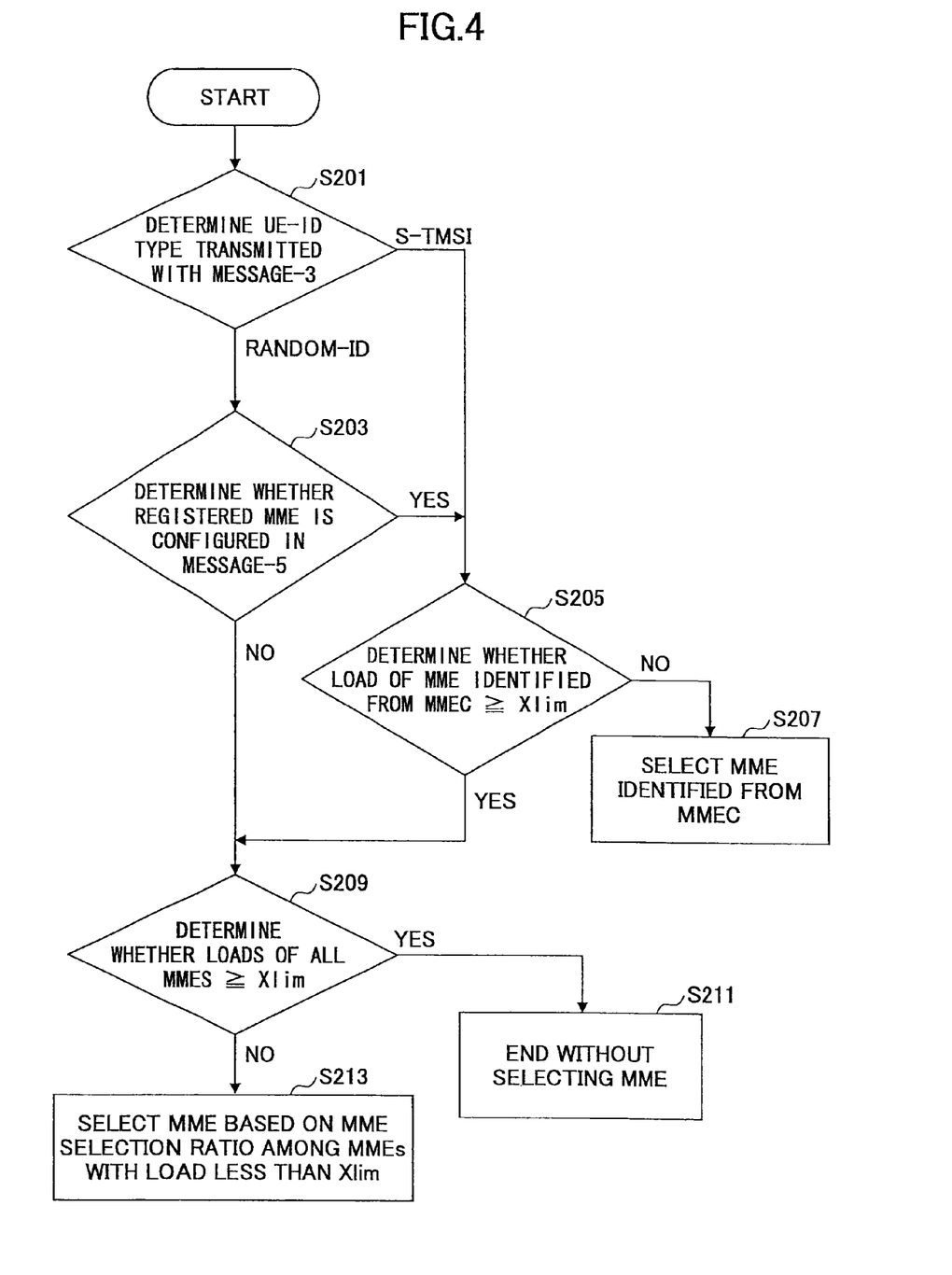
FIG. 4 shows a flowchart of a method of determining a connection-target MME in a radio control base station in accordance with an embodiment of the present invention.

FIG. 4 shows a flowchart of a method of determining a connection-target MME in a radio control base station in accordance with an embodiment of the present invention.

In some cases, information about an MME is included in the Message 3 or the Message 5 shown in FIG. 3, and thus a UE can identify an MME within the pool area in which the UE is situated. In other cases, a UE cannot identify from the Message 3 or Message 5 an MME within the pool area in which the UE is situated. When information about an MME within the pool area in which the UE is situated is included in the Message 3 or the Message 5, this MME is selected with a higher priority. As a result, a connection-target MME need not be frequently reselected within the pool area.

The eNB determines whether a UE identifier included in the Message 3 is an S-TMSI (SAE Temporary Mobile Subscriber Identity) (S201). The S-TMSI is a UE identifier allocated by an MME upon a tracking area update. In this manner, the eNB can identify from the S-TMSI a code (MMEC: MME Code) of the MME which has allocated the S-TMSI.

When the UE identifier included in the Message 3 is not an S-TMSI (when the UE identifier is a Random-ID), the eNB determines whether a registered MME is configured or included in the Message 5 (S203). When a tracking area update for the UE has been performed in any one of tracking areas, a registered MME is configured or included in the Message 5. Thus, the eNB can identify an MME Code (MMEC) of the registered MME from the Message 5.

When the eNB identifies the MMEC, the eNB determines whether the load of the MME identified from the MMEC is greater than or equal to an upper limit (Xlim) of an allowable load (S205). Typically, Xlim is larger than the predetermined threshold X1 above which an MME is in the overloaded state. When the load of the MME identified from the MMEC is less than Xlim, the eNB selects the MME identified from the MMEC (S207).

When the load of the MME identified from the MMEC is greater than or equal to Xlim, the eNB determines whether the loads of all the MMEs within the pool area are greater than or equal to Xlim (S209). When the loads of all the MMEs within the pool area are greater than or equal to Xlim, the eNB does not select an MME (S211). As a result, a call from the UE will be lost.

When the loads of some MMEs within the pool area are less than Xlim, the eNB selects a connection-target MME from the MMEs whose loads are less than Xlim based on an MME selection ratio. The MME selection ratio $R(1):R(2): \ldots :R(N-n)$ is calculated as follows:

$$R(i)=C(i)*\{100-L(i)\} \ (i=1,2,\ldots,N-n) \quad (1)$$

$$R(1):R(2):\ldots:R(N-n) \ (1 \leq n < N) \quad (2)$$

Where R(i) is a selection ratio for an MMEi, C(i) is a capacity of the MMEi, L(i) is a load of the MMEi, N is the number of MMEs within the pool area, and n is the number of MMEs whose loads are above Xlim. The eNB calculates each of the selection ratios for (N−n) MMEs according to the equation (1) and selects a connection-target MME based on the ratio calculated from the equation (2) in a round robin manner.

With reference to examples shown in FIGS. 5-7, the flowchart of FIG. 4 is described in detail below. In the examples shown in FIGS. 5-7, it is assumed that the eNB has received capacity information from all MMEs and received load information from MMEs in the overloaded state.

Figure 5:
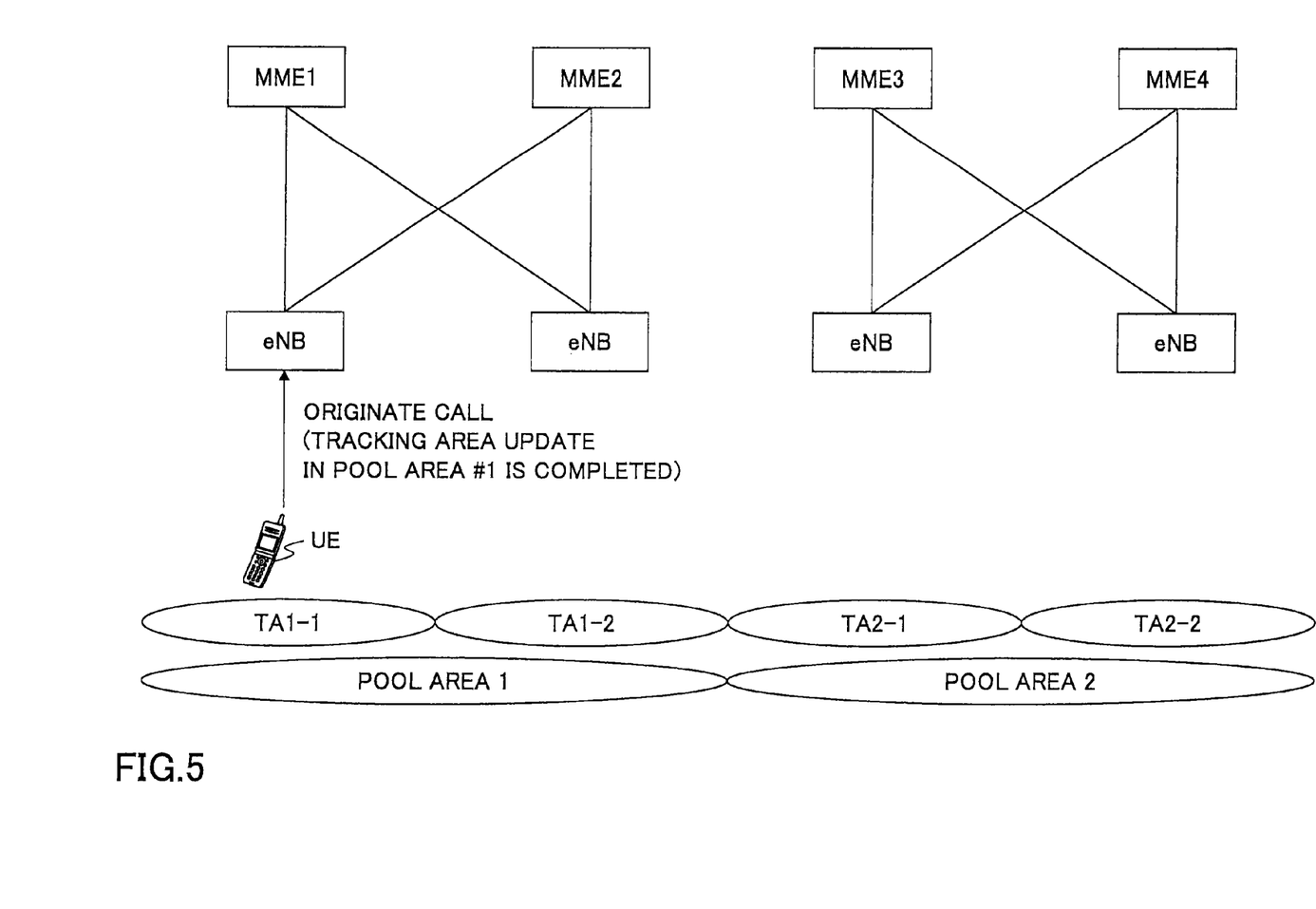
FIG. 5 shows one example to which a method of determining a connection-target MME in accordance with an embodiment of the present invention is applied.

FIG. 5 corresponds to the case where the UE is powered on, and then the UE originates a call after a communication link is established between the UE and the eNB. In this case, the UE-ID in the Message 3 is an S-TMSI.

When the communication link is established between the UE and the eNB, a tracking area update for the UE has been performed in any one of MMEs within the pool area. When the UE originates a call in the same tracking area TA1-1, the Message 3 transmitted from the UE includes an S-TMSI as an identifier of the UE. From the Message 3, the eNB can determine a connection target MME by identifying the MMEC of the MME which allocates the S-TMSI (S201: S-TMSI). When the load of the MME is less than Xlim (S205: NO), the eNB selects the MME (S207). When the load of the MME is greater than or equal to Xlim (S205: YES), the eNB selects a connection-target MME (S213) among MMEs within the same pool area whose loads are less than Xlim (S209: NO) according to the equations (1) and (2). When n is equal to N, that is, when the loads of all the MMEs are greater than or equal to Xlim (S209: YES), an MME is not selected and thus the call is lost (S211).

Figure 6:
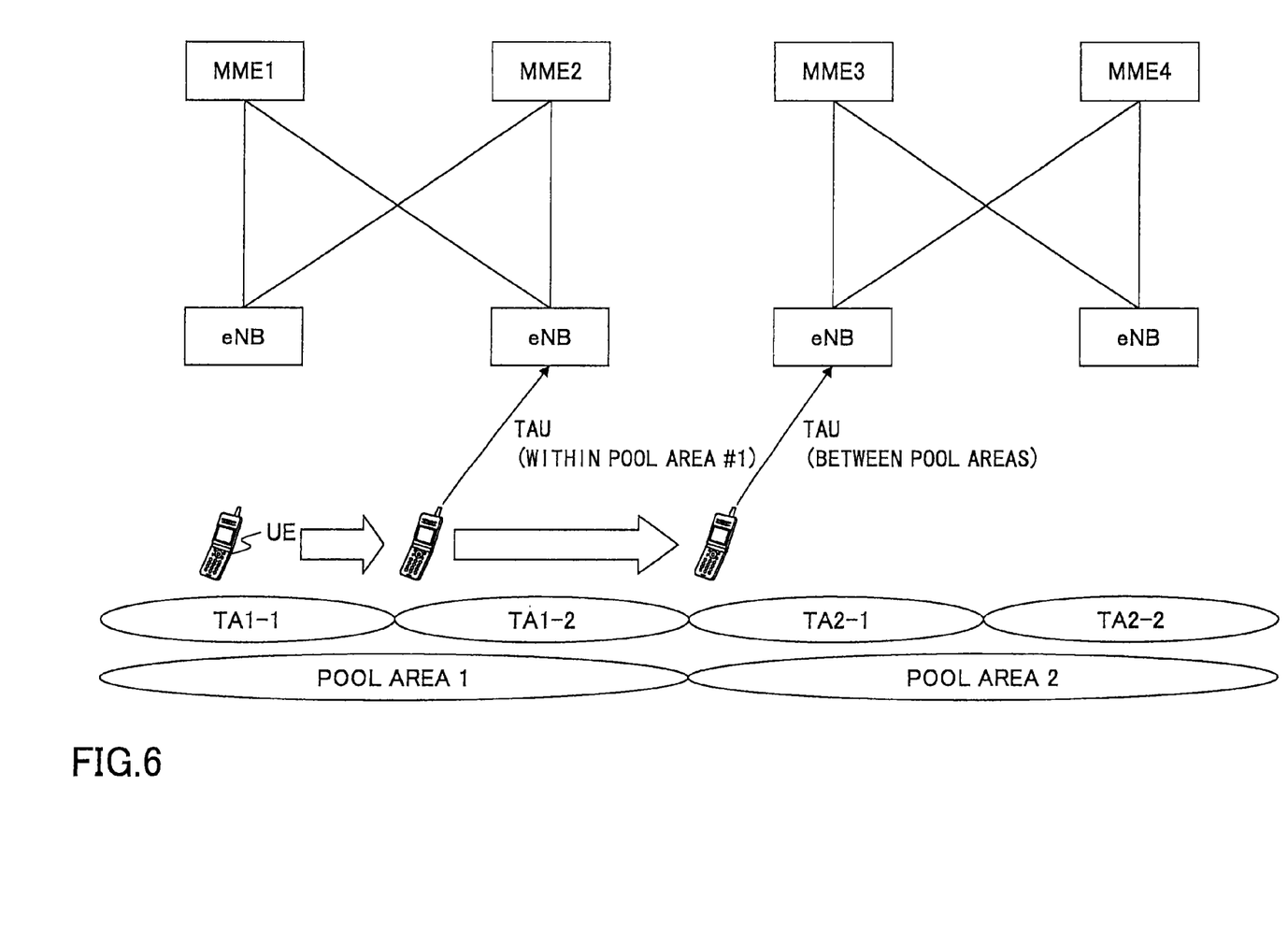
FIG. 6 shows another example to which a method of determining a connection-target MME in accordance with an embodiment of the present invention is applied.

FIG. 6 corresponds to the case where the UE changes the tracking area after the MME is selected according to the example shown in FIG. 5. In this case, the UE-ID in the Message 3 is a Random-ID.

When the UE moves from the tracking area TA1-1 to another tracking area TA1-2 within the same pool area 1, the UE performs a tracking area update (TAU) with a target MME (MME to be selected in the tracking area TA1-2) within the tracking area TA1-2. Since a Random-ID is configured or included in the Message 3 upon TAU, an MME cannot be identified (S201: Random-ID). However, the MMEC of the MME before TAU can be identified from information about a registered MME in the Message 5 to be subsequently transmitted from the UE (S203: YES). Since the UE moves around within the same pool area, the eNB selects the MME identified from the MMEC as a candidate for a connection-target MME (S205). Then, the connection-target MME is selected as described with reference to FIG. 5.

Further, it is assumed that the UE moves to a different pool area. When the UE moves from pool area 1 to pool area 2, the tracking area is also updated. Then, the UE performs a tracking area update (TAU) with a target eNB. Since a Random-ID is configured or included in the Message 3 upon TAU, an MME cannot be identified (S201: Random-ID). The MMEC of the MME before TAU can be identified from information about a registered MME in the Message 5 to be subsequently transmitted from the UE. However, the UE moves to the different pool area, the eNB cannot select the MME identified from the MMEC as a connection-target MME (S203: NO). Then, the eNB selects a connection-target MME (S213) among MMEs within the pool area 2 whose loads are less than Xlim (S209: NO) according to the equations (1) and (2). When n is equal to N, that is, when the loads of all the MMEs are greater than or equal to Xlim (S209: YES), an MME is not selected and thus the call is lost (S211).

Figure 7:
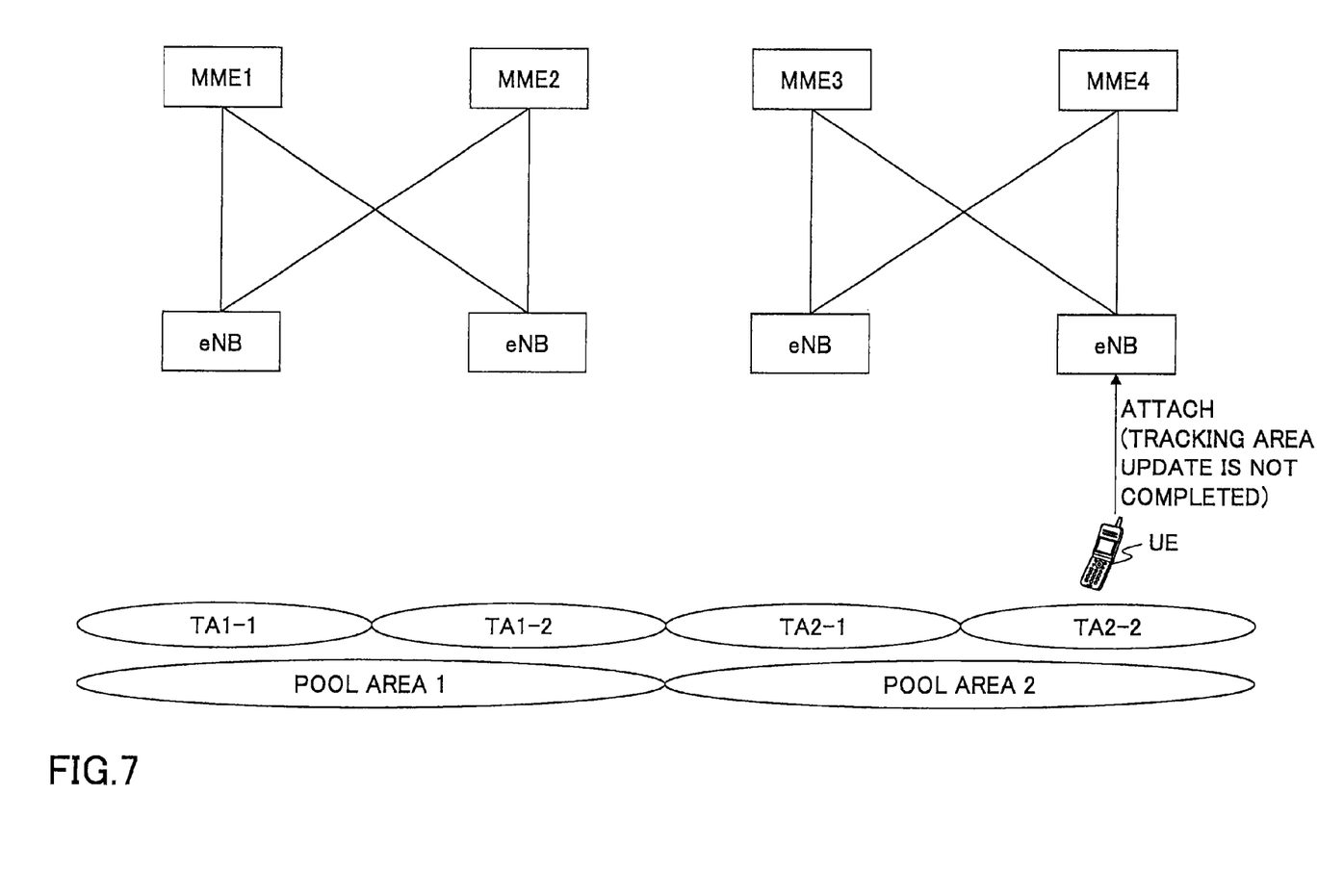
FIG. 7 shows another example to which a method of determining a connection-target MME in accordance with an embodiment of the present invention is applied.

FIG. 7 corresponds to the case where a communication link is established between the UE and the eNB due to restart of the UE. In this case, the UE-ID in the Message 3 is a Random-ID.

When a communication link is not established, a tracking area update of the UE has not been performed (or information about the tracking area of the UE is deleted because the UE is detached from the network due to a shutdown of the UE or the like). Thus, a Random-ID is configured or included in the Message 3 and an MME cannot be identified (S201: Random-ID). The MMEC is not included in information about a registered MME in the Message 5 to be subsequently transmitted from the UE. Thus, the eNB cannot identify an MME (S203: NO). Then, the eNB selects a connection-target MME (S213) among MMEs within the pool area 2 whose loads are less than Xlim (S209: NO) according to the equations (1) and (2). When n is equal to N, that is, when the loads of all the MMEs are greater than or equal to Xlim (S209: YES), an MME is not selected and thus the call is lost (S211).

In this manner, when information about the MME within the pool area in which the UE is situated is included in the Message 3 or the Message 5, this MME is selected with a higher priority. On the other hand, an MME cannot be identified, a connection-target MME is selected according to the selection ratio calculated according to the equations (1) and (2).

For convenience of explanation, the apparatus according to the embodiments of the present invention has been described with reference to functional block diagrams, but the apparatus may be implemented in hardware, software, or combinations thereof. In addition, two or more embodiments or modifications may be combined as appropriate.

For convenience of explanation, the method according to the embodiments of the present invention has been described with reference to flowcharts or sequence diagrams, but the method may be implemented in a sequence different from the sequence shown in the embodiments.

Effects of Embodiments

According to an embodiment of the present invention, a connection-target MME for a UE can be determined in consideration of loads of MMEs and thus load distribution of the MMEs can be achieved.

Since an eNB receives load information only from MMEs in the overloaded state, the eNB can calculate the selection ratio only when an MME in the overloaded state exists. In other words, the eNB need not always calculate the selection ratio.

In addition, when information about an MME within the pool area in which the UE is situated is included in the Message 3 or the Message 5, this MME is selected with a higher priority. As a result, a connection-target MME need not be frequently reselected within the pool area.

While the embodiments of the radio control base station and the method of determining a connection-target switching center have been described above, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2011-124503 filed on Jun. 2, 2011, the entire contents of which are hereby incorporated by reference.

DESCRIPTION OF NOTATIONS 10 radio control base station (eNB)
101 capacity information receiving unit
103 load information receiving unit
105 connection-target MME selection ratio calculating unit
107 connection target MME determining unit
109 message receiving unit

The invention claimed is:

1. A radio control base station connected to a plurality of switching centers, comprising:
a communication interface configured to
receive capacity information from at least one of the plurality of switching centers; and
receive load information from at least one of the plurality of switching centers; and
circuitry configured to
calculate a selection ratio for selecting a connection-target switching center to which a call from a mobile station is to be connected based on the received capacity information and the received load information by multiplying a maximum load minus the load information by a capacity of a switching center having a load less than a first predetermined threshold; and
determine the connection-target switching center based on the calculated selection ratio,
wherein
the communication interface is configured to receive the load information transmitted from a switching center, when a load of the switching center is greater than or equal to a second predetermined threshold.

2. A radio control base station connected to a plurality of switching centers, comprising:
a communication interface configured to
receive a radio connection request message and a radio connection complete report message for a call from a mobile station;
receive capacity information from at least one of the plurality of switching centers; and
receive load information from at least one of the plurality of switching centers; and
circuitry configured to
calculate a selection ratio for selecting a connection-target switching center to which the call from the mobile station is to be connected based on the received capacity information and the received load information; and
determine the connection-target switching center based on the calculated selection ratio, wherein
the circuitry is configured to determine whether a switching center is identified from the radio connection request message or the radio connection complete report message, and determine the connection-target switching center based on the calculated selection ratio, when the switching center within a pool area in which the mobile station is situated is identified from the radio connection request message or the radio connection complete report message, when the load information received from the switching center is greater than or equal to a first predetermined threshold, and when all items of the load information received from the plurality of switching centers are less than the first predetermined threshold.

3. The radio control base station as claimed in claim 1, wherein
the communication interface is configured to receive a radio connection request message and a radio connection complete report message for the call from the mobile station;
wherein the circuitry is configured to determine the connection-target switching center based on the calculated selection ratio, when a switching center within a pool area in which the mobile station is situated is not identified from the radio connection request message or the radio connection complete report message and when at least one item of the load information received from the plurality of switching centers are less than a first predetermined threshold.

4. A method of determining a connection-target switching center in a radio control base station connected to a plurality of switching centers, comprising the steps of:
receiving capacity information from at least one of the plurality of switching centers;
receiving load information from at least one of the plurality of switching centers;
calculating a selection ratio for selecting the connection-target switching center to which a call from a mobile station is to be connected based on the received capacity information and the received load information by multiplying a maximum load minus the load information by a capacity of a switching center having a load less than a first predetermined threshold;
determining the connection-target switching center based on the calculated selection ratio; and
receiving the load information transmitted from a switching center, when a load of the switching center is greater than or equal to a second predetermined threshold.

5. A method of determining a connection-target switching center in a radio control base station connected to a plurality of switching centers, comprising the steps of:
receiving a radio connection request message and a radio connection complete report message for a call from a mobile station;
receiving capacity information from at least one of the plurality of switching centers;
receiving load information from at least one of the plurality of switching centers;
calculating a selection ratio for selecting the connection-target switching center to which a call from a mobile station is to be connected based on the received capacity information and the received load information; and
determining the connection-target switching center based on the calculated selection ratio, wherein
the determining includes determining whether a switching center is identified from the radio connection request message or the radio connection complete report message, and determining the connection-target switching center based on the calculated selection ratio, when the switching center within a pool area in which the mobile station is situated is identified from the radio connection request message or the radio connection complete report message, when the load information received from the switching center is greater than or equal to a first predetermined threshold, and when all items of the load information received from the plurality of switching centers are less than the first predetermined threshold.

* * * * *